(12) United States Patent
Kyburz

(10) Patent No.: US 6,439,277 B1
(45) Date of Patent: Aug. 27, 2002

(54) METHOD FOR REDUCING FUEL TANK VAPOR EMISSION

(76) Inventor: Hans Kyburz, Weidenstrass 4, CH-4143 Dormach (CH)

(*) Notice: Subject to any disclaimer, the term of this patent is extended or adjusted under 35 U.S.C. 154(b) by 0 days.

(21) Appl. No.: 09/806,554
(22) PCT Filed: Sep. 17, 1999
(86) PCT No.: PCT/EP99/06893
§ 371 (c)(1), (2), (4) Date: Jun. 12, 2001
(87) PCT Pub. No.: WO00/20244
PCT Pub. Date: Apr. 13, 2000

(30) Foreign Application Priority Data

Oct. 1, 1998 (DE) ............................. 198 45 197

(51) Int. Cl.$^7$ ................................. B65B 1/04
(52) U.S. Cl. .................. 141/98; 141/98; 141/82; 220/862; 220/746
(58) Field of Search ............... 141/82, 59, 98; 220/86.1, 86.2, 746; 123/41.2, 41.31

(56) References Cited

U.S. PATENT DOCUMENTS

| | | |
|---|---|---|
| 3,921,412 A | 11/1975 | Heath et al. |
| 4,963,169 A | 10/1990 | Granville |
| 5,054,453 A | 10/1991 | Onufer |
| 5,415,196 A | 5/1995 | Bryant et al. |
| 5,636,668 A | 6/1997 | Thompson |

FOREIGN PATENT DOCUMENTS

| | | |
|---|---|---|
| DE | 321 48 74 A1 | 11/1983 |
| DE | 196 29 165 C1 | 10/1997 |
| WO | WO 92/14626 | 9/1992 |

*Primary Examiner*—Steven O. Douglas
(74) *Attorney, Agent, or Firm*—Husch & Eppenberger, LLC; Robert E. Muir

(57) ABSTRACT

A fuel tank, especially that of a motor vehicle, substantially reduces emission of fuel vapor from the fuel tank during refueling. Part of the fuel tank is cooled so that the rising fuel vapor condenses and flows back to the fuel tank, instead of vaporizing and releasing into the environment outside of the fuel tank.

17 Claims, 1 Drawing Sheet

METHOD FOR REDUCING FUEL TANK VAPOR EMISSION

CROSS REFERENCES

This application is a submission in connection with PCT Application PCT/EP99/06893, filed on Sep. 17, 1999, to enter the national stage under 35 U.S.C. 371. PCT Application PCT/EP99/06893 was published on Apr. 13, 2000 as Publication No. WO 00/20244 and claims priority of German Application 198 45 197.0 filed on Oct. 1, 1998.

FIELD OF THE INVENTION

The invention concerns a method for reducing the escape of fuel gases from a fuel tank for liquid fuel during a filling operation performed via a filler section of the fuel tank. The invention further concerns a motor vehicle with a fuel tank which is provided with a filler section into which a filling device can be introduced for performing a filling operation.

BACKGROUND OF THE INVENTION

In fuel tanks for liquid fuel, a gas phase forms above the liquid fuel. The gas pressure of this gas phase is essentially determined by the type of liquid fuel and the ambient temperature. If the fuel tank is nearly empty, it must be refilled with liquid fuel to maintain the functioning capacity of the motor vehicle. For automobiles, this is usually accomplished at gasoline stations. Upon introduction of the liquid fuel, the liquid fuel displaces gas volume from the fuel tank so that corresponding fuel gases escape from the fuel tank during refueling and pass into the environment. The person refilling the fuel tank is exposed to the fuel gases in the process. Furthermore, general air pollution by the fuel gases occurs as a result.

It is known that filling devices connected by a hose to the gasoline station tank are provided with an extraction pump which extracts fuel gases that are displaced from the fuel tank during the filling operation and routes the fuel gases back into the gasoline station tank. If oversaturation of the gas phase in the gasoline station tank occurs in the process, this results in condensation of the fuel gases into liquid fuel in the gasoline station tank. Fitting gasoline stations with such extraction devices requires relatively expensive conversion of the gasoline stations, so that a short-term solution of the problem of fuel gases escaping during the filling operation cannot be achieved.

SUMMARY OF THE INVENTION

It is therefore the problem of the present invention to make a reduction of the escape of fuel gases from a fuel tank for liquid fuel during a filling operation necessary without conversion measures on gasoline stations which can be accomplished only slowly.

Starting from this problem, according to the invention a method of the kind mentioned hereinbefore is characterized in that, by cooling of at least a portion of the fuel tank, condensation of the fuel gases is performed.

The present invention is based on the idea of conducting the fuel gases contained in the fuel tank, which during the filling operation are expelled from the volume of the fuel tank by introduction of the liquid fuel, back into the fuel tank in which the fuel gases are caused to condense by cooling of at least a portion of the fuel tank and are added as condensed fuel to the liquid fuel contained in the fuel tank.

The advantage of the invention lies in that no transport of fuel gases into a storage tank, for example gasoline station tank, from which filling of the fuel tank to be filled is performed, is necessary, but that the fuel gases remain in condensed form in the newly filled fuel tank.

Although it is possible to cool the whole fuel tank, however it is preferable, for the purpose of saving energy, to cool only the upper portion of the fuel tank, as the fuel gases come into contact with the upper portion of the fuel tank during the filling operation. Particularly, it is preferable to cool the fuel in the filler section, as the latter has a wall surface surrounding a relatively small volume and can therefore be cooled efficiently by cooling the wall of the fuel tank.

For motor vehicles which are refueled at a stationary filling apparatus, such as land and water vehicles at gasoline stations or aircraft at airport fuelling vehicles, it is particularly advantageous if cooling is performed just shortly before the refueling operation, to minimize the energy needed for cooling. To that end, the present invention could provide that the filling operation for the fuel tank is operationally contingent upon the cooling of the fuel tank to a given degree, thus ensuring the prevention of even greater quantities of fuel gases escaping into the environment during the filling operation due to an absence of cooling or insufficient cooling.

A motor vehicle may be further equipped with a switchable cooling device arranged in or on the fuel tank for cooling of at least a portion of the fuel tank to a temperature below the condensation temperature of the fuel gases.

The required cooling is achieved upon dropping below the condensation temperature at least of a preponderance of the components contained in the fuel gases.

The cooling device is appropriately designed for cooling of at least the filler section of the fuel tank. To carry out cooling just shortly before a refueling operation, the cooling device can advantageously be activated by a switch accessible from the interior of the motor vehicle.

The cooling device for the fuel tank can be formed by a heat exchanger through which a refrigerant flows and which can be arranged on the outside of the fuel tank and in heat-conducting contact with a wall of the fuel tank. In the alternative, a heat exchanger can be integrated in the fuel tank. In the latter case, the fuel tank can preferably comprise a double-walled region which is provided with connections for the refrigerant.

One embodiment of the present invention may provide for cooling of the fuel tank by its own refrigerating machine. But in vehicles which are already equipped with an air conditioning system, it is preferable to use the refrigerant from the circuit of the air conditioning system for cooling of the fuel tank, which may be accomplished, for example, by effectively switching a corresponding ancillary circuit for the refrigerant through the heat exchanger of the fuel tank.

DETAILED DESCRIPTION

In the figures is shown a fuel tank 1 containing liquid fuel 2. In the volume of the fuel tank not occupied by the liquid fuel 2, fuel gases 3 form by evaporation of the liquid fuel 2, thus creating a thermodynamic equilibrium.

Figure 1:
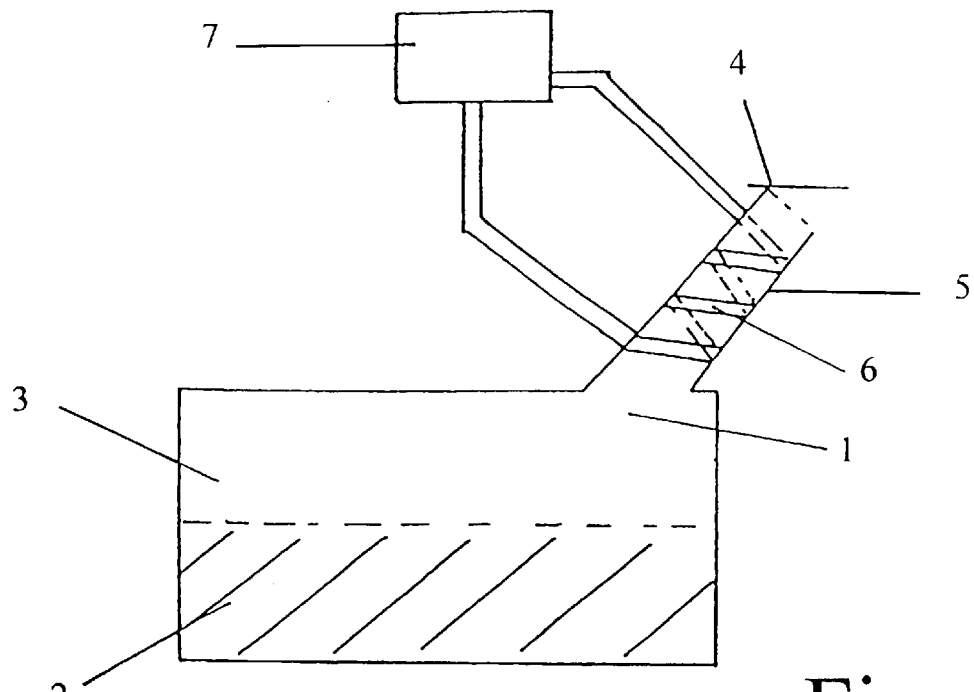
FIG. 1 is a schematic view of an embodiment of a fuel tank with cooling device.

FIG. 1 shows a fuel tank 1 of a motor vehicle according to the invention. In the sealed fuel tank 1, fuel gases 3 form above the liquid fuel 2. The liquid fuel 2 and the fuel gases 3 are in thermodynamic equilibrium after some time. Upon opening a tank cap 4 of the tank filling device 5, fuel gases 3 escape into the environment. This leads to air pollution.

In the embodiment of the invention shown in FIG. 1, a cooling coil 6, which serves as a heat exchanger, is constructed as a filler pipe in the tank filling device 5. The cooling coil 6 and a refrigerating machine 7 connected thereto have dimensions such that, after putting the refrigerating machine 7 into operation and after the passage of a certain amount of time, a constant lower temperature forms along the filler pipe 5. After dropping below the dew point temperature of the fuel gases 3 in the region of the filler pipe 5, the fuel gas 3 condenses in the filler pipe 5. The condensed fuel runs down the filler pipe 5 into the fuel tank 1 and is fed back into the liquid fuel 1. The condensation in the filler pipe 5 caused by cooling, reduces the quantity of fuel gases in this region. After opening the tank cap 4 of the filler pipe 5, a relatively small quantity of fuel gas 3, may possibly escape. During refueling of the motor vehicle, the end of the gasoline pump nozzle is introduced into the filler pipe. The end does not collide with the cooling coil 6 of the filler pipe 5. The fuel gases, which form during refueling, condense likewise, mainly along the cooling coil 6 of the filler pipe 5.

Figure 2:
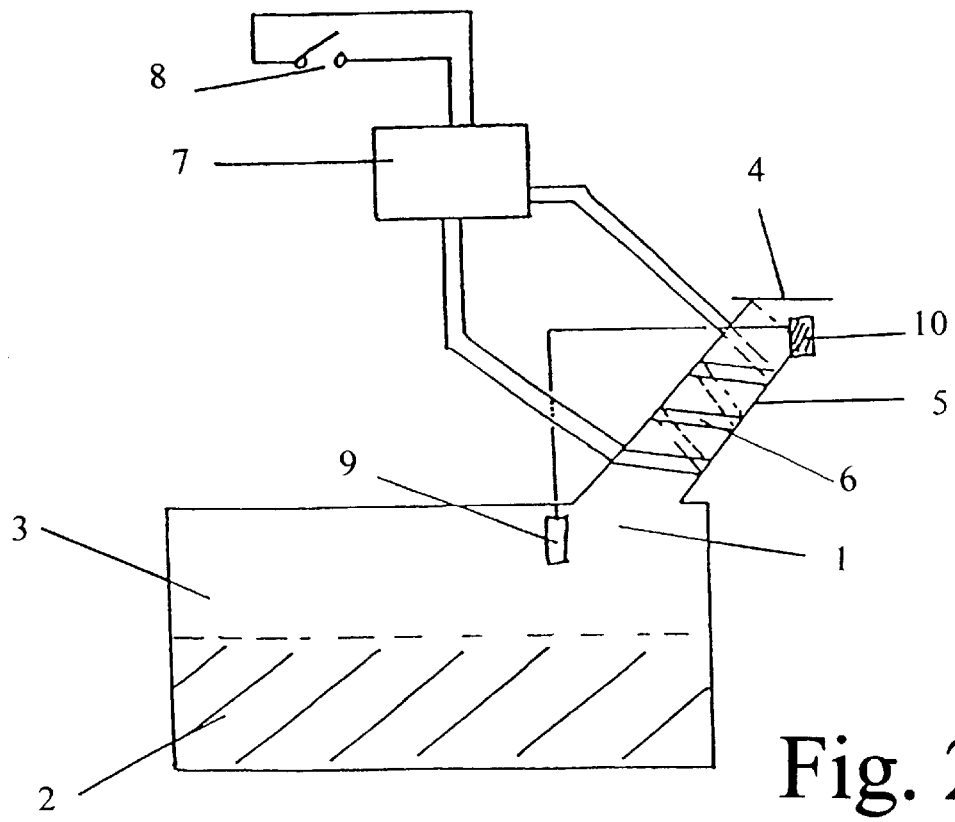
FIG. 2 is a schematic view of a modification of the arrangement according to FIG. 1.

FIG. 2 shows another embodiment of a cooled fuel tank 1. Some time before refueling of the motor vehicle, the refrigerating machine 7 is activated. During normal operation of the motor vehicle, the refrigerating machine 7 is switched off. The refrigerating machine 7 is switched on and off by a switch 8 which is preferably attached to the instrument panel of the motor vehicle. A temperature sensor 9 signals to an automatic closure device 10 for the tank cap 4 when the temperature has dropped below a given temperature. This temperature is selected below the dew point temperature of the fuel gas 3. Thus the tank cap 4 is unlocked by the closure device 10. The tank cap 4 can only be opened when there is a minimal amount of fuel gas 3 in the filler pipe 5 of the fuel tank 1, so that only small quantities of fuel gas 3 can escape.

The mounting shown for the cooling coil 6 in the region of the filler pipe 5 is regarded as advantageous, but is not compulsory. Also, a corresponding cooling coil 6 can preferably also be arranged in the upper region of the fuel tank 1, which causes the condensation of fuel gases 3 forced upwards by the liquid fuel 2 introduced into the fuel tank 1 during the filling operation.

What is claimed is:

1. A method for reducing the escape of fuel gases from a fuel tank during a filling operation performed via a filler section of the fuel tank, wherein by cooling at least a portion of the fuel tank, condensation of the fuel gases results, including the steps of
cooling a portion of the fuel tank just shortly before a refueling operation;
signaling by a temperature sensor that the temperature has dropped below a given temperature; and
filling the fuel tank only if said signal of the temperature sensor is received.

2. A method according to claim 1, wherein cooling is performed at least in the filler section.

3. A motor vehicle with a fuel tank which is provided with a filler section into which a filling device can be introduced for performing a fuel filling operation, a switchable cooling device arranged at the fuel tank for cooling at least a portion of the fuel tank to a temperature below the condensation temperature of the fuel gases, a temperature sensor which signals when the temperature has dropped below a given temperature, and an automatic closure device for a tank cap, the automatic closure device being controlled by the temperature sensor for unlocking the tank cap after the temperature has dropped below a given temperature.

4. A motor vehicle according to claim 3, wherein the cooling device is designed for cooling at least the filler section of the fuel tank.

5. A motor vehicle according to claim 3, wherein the cooling device is comprised of a heat exchanger through which a refrigerant flows.

6. A motor vehicle according to claim 5, wherein the heat exchanger is integrated in the fuel tank.

7. A motor vehicle according to claim 5, wherein the fuel tank has a double-walled region which is provided with connections for the refrigerant.

8. A motor vehicle with a fuel tank which is provided with a filler section into which a filling device can be introduced for performing a fuel filling operation, a switchable cooling device arranged at the fuel tank for cooling at least a portion of the fuel tank to a temperature below the condensation temperature of the fuel gases, a temperature sensor which signals when the temperature has dropped below a given temperature, and a switch accessible from the interior of the motor vehicle for switching the cooling device.

9. A motor vehicle according to claim 8, wherein the cooling device is designed for cooling at least the filler section of the fuel tank.

10. A motor vehicle according to claim 8, wherein the cooling device is comprised of a heat exchanger through which a refrigerant flows.

11. A motor vehicle according to claim 8, wherein the heat exchanger is arranged on the outside of the fuel tank in heat-conducting contact with a wall of the fuel tank.

12. A motor vehicle according to claim 8, wherein the fuel tank has a double-walled region which is provided with connections for the refrigerant.

13. A motor vehicle according to claim 8, wherein the heat exchanger is integrated in the fuel tank.

14. A motor vehicle with a fuel tank which is provided with a filler section into which a filling device can be introduced for performing a fuel filling operation, a switchable cooling device arranged at the fuel tank for cooling at least a portion of the fuel tank to a temperature below the condensation temperature of the fuel gases, and a temperature sensor which signals when the temperature has dropped below a given temperature, the cooling device including a heat exchanger through which a refrigerant flows, and which heat exchanger is arranged on the outside of the fuel tank in heat-conducting contact with a wall of the fuel tank.

15. A motor vehicle according to claim 14, wherein the heat exchanger is integrated in the fuel tank.

16. A motor vehicle according to claim 14, wherein the fuel tank has a double-walled region which is provided with connections for the refrigerant.

17. A motor vehicle with a fuel tank which is provided with a filler section into which a filling device can be introduced for performing a fuel filling operation, a switchable cooling device arranged at the fuel tank for cooling at least a portion of the fuel tank to a temperature below the condensation temperature of the fuel gases, and a temperature sensor which signals when the temperature has dropped below a given temperature, the cooling device including a heat exchanger through which a refrigerant flows, and wherein the motor vehicle has an air conditioning system for cooling the refrigerant.

* * * * *